No. 653,446. Patented July 10, 1900.
A. GOHL.
INCLINOMETER.
(Application filed Nov. 10, 1899.)
(No Model.)
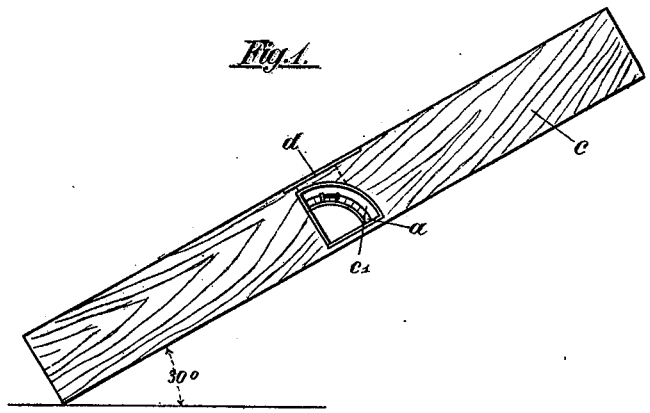
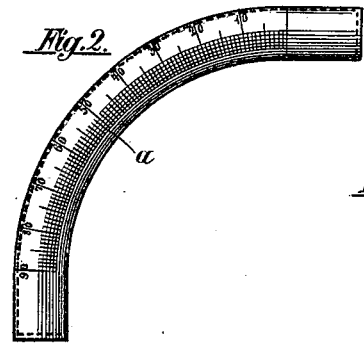
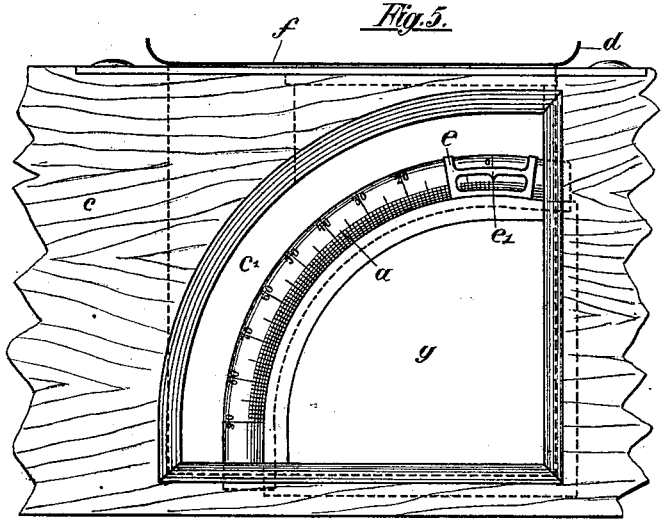
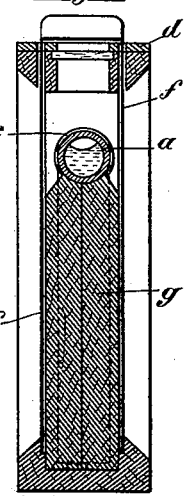
Witnesses:
N. Mitchell
Anton Gloetzner
Inventor:
Adolf Gohl
by Max Georgii
his attorney

UNITED STATES PATENT OFFICE.

ADOLF GOHL, OF WANGEN, GERMANY.

INCLINOMETER.

SPECIFICATION forming part of Letters Patent No. 653,446, dated July 10, 1900.

Application filed November 10, 1899. Serial No. 736,529. (No model.)

*To all whom it may concern:*

Be it known that I, ADOLF GOHL, a citizen of the German Empire, residing at Wangen, near Cannstadt, in the Kingdom of Würtemberg, Germany, have invented certain new and useful Improvements in Inclinometers; and I do hereby declare the following to be a full, clear, and exact description of the invention, such as will enable others skilled in the art to which it appertains to make and use the same.

The subject of the present invention is a new or improved spirit-level for measuring angles, essentially consisting of a transparent glass tube so bent as to have the form of a quarter of a circle and provided with a scale of division into degrees. The said bent tube is, like the straight tube of an ordinary spirit-level, partially filled with sulfuric ether or other suitable liquid in such manner that a portion of the interior space is left free in order to hold the air required for forming the bubble.

If a spirit-level having the shape of a quadrant, as described, is secured to a ruler or straight-edge in such manner that the tangents at the ends of the quadrant glass tube are the one parallel and the other perpendicular to the straight-edge every angle formed by the latter and a horizontal line or surface can at once be ascertained by the air-bubble and the scale of degrees—an advantage which will prove of considerable importance, for instance, in laying down pipes and the like. The ruler or straight-edge can also be used for horizontal and vertical adjustment in builders' and similar work.

Reference is had to the accompanying drawings, in which the reference-letters refer to the same parts in the several views.

Figure 1 shows a straight-edge provided with the improved spirit-level and placed at an incline of thirty degrees to the horizontal. Figs. 2 and 3 illustrate the spirit-tube respectively in side elevation and front view. Fig. 4 shows an indicator-clip adapted to be pushed over and moved along the glass tube in side view and also vertical section. Fig. 5 shows the spirit-level inserted into the respective portion of a straight-edge on an enlarged scale as compared with Fig. 1. Fig. 6 is a vertical cross-section of Fig. 5.

The quadrant-shaped glass tube $a$ is secured by means of its ends, which are slightly continued in straight lines beyond the quarter of the circle, so as to stand at right angles to each other, in suitably-prepared beds in the sides of the aperture $c'$, cut out in ruler or straight-edge $c$, by means of putty or in other convenient manner. The lower surface of tube $a$ is made to rest in a correspondingly-hollowed-out support $g$, the edges of which are beveled in order to facilitate the observation of the scale of degrees on the glass tube. If desired, the scale of degrees may be on the said beveled edges instead of being indicated on the glass tube $a$. The body of straight-edge or ruler $c$ being weakened by preparing the aperture $c'$ for the reception of the spirit-level, metal plate $d$ may be provided and secured by screws or the like in order to strengthen the said ruler.

For the purpose of protecting the spirit-level $a$ from damage when the same is not required for use there is provided a U-shaped double shield $f$, made of sheet metal or the like and adapted to be inserted and drawn out in longitudinal slots arranged in the body of the ruler or straight-edge $c$ in such manner that the aperture $c'$ can thereby be efficiently covered up at both sides of the glass tube $a$.

The indicator-clip $e$ is movable upon the glass tube $a$ and serves to indicate the exact angle of the straight-edge to the horizontal if the air-bubble is made to lie between the two arms of the clip.

By aid of the hereinbefore-described instrument the degrees of any angle from zero to ninety degrees can be expeditiously ascertained, or stones, pipes, beams, and the like can be laid down or adjusted in any given angle to the horizontal. The improved instrument may also be used in place of the ordinary straight-tube spirit-level for horizontal or vertical adjustment.

Having now particularly described and ascertained the nature of my said invention and in what manner the same is to be performed, I declare that what I claim is—

1. The combination in an instrument of the character described, with a straight-edge and a quadrant-tube containing an indicating-bubble and having graduations on its exposed side, of an indicating-clip having an orifice and being adapted to slide on the tube to cause said orifice to register with said bubble, said clip having another orifice arranged to expose said graduations, and a pointer extending into said latter orifice and arranged to register with said graduations.

2. The combination in an instrument of the character described, with a straight-edge and a quadrant-tube containing an indicating-bubble and having graduations on its exposed side, of an indicating-clip adapted to slide on the tube, said clip comprising a pair of bands encircling the tube for about two hundred degrees, pairs of narrow strips connecting the bands, one pair on each side of its middle portion, and a pointer on one of said bands extending toward the other band and adapted to register with said graduations, substantially as set forth.

3. The combination of a straight-edge having an interiorly-disposed indicating-tube exposed at opposite sides of the instrument, the straight-edge having parallel longitudinal grooves one on each side of said tube, and a casing having parallel sides connected by a narrow strip, said sides adapted to slide longitudinally in said grooves to cover and to expose said tube, substantially as and for the purposes set forth.

In testimony whereof I affix my signature in presence of two witnesses.

ADOLF GOHL.

Witnesses:
AUGUST DRAUTZ,
HERMANN WAGNER.